US008469656B1

(12) United States Patent
Diakunchak

(10) Patent No.: US 8,469,656 B1
(45) Date of Patent: Jun. 25, 2013

(54) AIRFOIL SEAL SYSTEM FOR GAS TURBINE ENGINE

(75) Inventor: Ihor S. Diakunchak, Ontario (CA)

(73) Assignee: Siemens Energy, Inc., Orlando, FL (US)

( * ) Notice: Subject to any disclaimer, the term of this patent is extended or adjusted under 35 U.S.C. 154(b) by 1562 days.

(21) Appl. No.: 12/014,298

(22) Filed: Jan. 15, 2008

(51) Int. Cl.
F01D 11/02 (2006.01)

(52) U.S. Cl.
USPC .................. 415/173.7; 415/174.2

(58) Field of Classification Search
USPC .......... 415/173.7, 174.2, 174.3; 416/174
See application file for complete search history.

(56) References Cited

U.S. PATENT DOCUMENTS

| 3,752,598 | A | 8/1973 | Bowers et al. |
| 3,768,924 | A | 10/1973 | Corsmeier et al. |
| 3,975,114 | A | 8/1976 | Kalkbrenner |
| 3,986,789 | A | 10/1976 | Pask |
| 4,422,827 | A | 12/1983 | Buxe et al. |
| 4,439,107 | A | 3/1984 | Antonellis |
| 4,464,096 | A | 8/1984 | Trousdell et al. |
| 4,643,645 | A | 2/1987 | Robbins et al. |
| 4,875,830 | A | 10/1989 | Trousdell et al. |
| 5,125,796 | A | 6/1992 | Cromer |
| 5,474,305 | A | * | 12/1995 | Flower ........................ 277/355 |
| 6,017,189 | A | 1/2000 | Judet et al. |
| 6,206,629 | B1 | 3/2001 | Reluzco et al. |
| 6,261,063 | B1 | 7/2001 | Chikami et al. |
| 6,267,381 | B1 | * | 7/2001 | Wright ........................ 277/355 |
| 6,340,285 | B1 | 1/2002 | Gonyou et al. |
| 6,402,466 | B1 | 6/2002 | Burdgick et al. |
| 6,464,453 | B2 | 10/2002 | Toborg et al. |
| 6,471,478 | B1 | 10/2002 | Mashey |
| 6,561,764 | B1 | 5/2003 | Tiemann |
| 7,059,829 | B2 | * | 6/2006 | Garner ........................ 415/173.7 |
| 7,101,147 | B2 | 9/2006 | Balsdon |
| 7,207,768 | B2 | 4/2007 | Gordon et al. |
| 2002/0067987 | A1 | 6/2002 | Toborg et al. |
| 2005/0232780 | A1 | 10/2005 | Newman |

FOREIGN PATENT DOCUMENTS

| EP | 0896128 A2 | 2/1999 |
| EP | 1211386 A2 | 6/2002 |
| JP | 2005113881 A | 4/2005 |
| WO | 9855736 A1 | 12/1998 |
| WO | 0171175 A1 | 9/2001 |

* cited by examiner

Primary Examiner — Richard Edgar

(57) ABSTRACT

A turbine airfoil seal system of a turbine engine having a seal base with a plurality of seal strips extending therefrom for sealing gaps between rotational airfoils and adjacent stationary components. The seal strips may overlap each other and may be generally aligned with each other. The seal strips may flex during operation to further reduce the gap between the rotational airfoils and adjacent stationary components.

14 Claims, 2 Drawing Sheets

AIRFOIL SEAL SYSTEM FOR GAS TURBINE ENGINE

STATEMENT REGARDING FEDERALLY SPONSORED RESEARCH

Development of this invention was supported in part by the United States Department of Energy, Contract No. DE-FC26-05NT42644. Accordingly, the United States Government may have certain rights in this invention.

FIELD OF THE INVENTION

This invention is directed generally to airfoils, and more particularly to cooling systems in hollow airfoils usable in gas turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. As a result, turbine blades must be made of materials capable of withstanding such high temperatures. In addition, turbine blades often contain cooling systems for prolonging the life of the blades and reducing the likelihood of failure as a result of excessive temperatures.

Typically, turbine blades are formed from a root portion having a platform at one end and an elongated portion forming a blade that extends outwardly from the platform coupled to the root portion. The blade is ordinarily composed of a tip opposite the root section, a leading edge, and a trailing edge. The inner aspects of most turbine blades typically contain an intricate maze of cooling channels forming a cooling system. The cooling channels in a blade receive air from the compressor of the turbine engine and pass the air through the blade. Some of the cooling fluids are passed through the root and into the cavity between adjacent turbine blades to cool the platforms of the blades. The cooling fluids may be exhausted through gaps between adjacent blades and may create film cooling. Various seals have been used to limit the flow of cooling fluids between the gap and to limit the influx of hot combustion gases through the gap.

Cooling air and hot gas leakages have a detrimental impact on performance of a gas turbine engine, nitrogen oxides (NOx) emissions and mechanical integrity of components. Air leakage detracts from turbine performance because energy is expended to compress air without incurring any benefit in turbine airfoil cooling and hence in metal temperature reduction. Excessive air leakage from disc cavities may disrupt the flow in the turbine airfoil channels, increase losses and decrease stage efficiency. Also, the more air is extracted from the compressor and dumped into the gas path downstream of the combustor, the higher the primary zone temperature in the combustor has to be for the required engine firing temperature. This results in increased NOx production. Hot gas ingestion into the turbine disc cavities leads to higher disc and blade root temperatures and may result in reduced service lives and failures. In addition, hot gas leakage through the blade root serrations and under the stator assemblies reduces turbine performance. Such losses are exacerbated in engines with increased firing temperatures and pressure ratios. For the same seal clearance, the increase in leakage is directly proportional to the increase in the pressure upstream of the seal. The pressure ratio increase is further driven by gas turbine applications.

Depending on the turbine disc cavity configuration, clearances at the disc rim and flow conditions in the gas path, the disc will pump a specific amount of air flow. If the supplied disc cooling air flow is not able to satisfy this amount, there will be hot gas ingestion from the gas path. As previously set forth, the air and hot gas leakages have a detrimental effect on the turbine performance and the mechanical integrity of the affected parts.

SUMMARY OF THE INVENTION

This invention relates to an airfoil seal system for a gas turbine engine that is configured to seal gaps between adjacent stationary airfoils, such as turbine or compressor vanes or other stationary components, and rotational airfoils, such as turbine or compressor blades. The airfoil seal system may be formed from a seal base having a plurality of seal strips extending therefrom and configured such that during operation of the gas turbine engine, the seal strips bend and reduce the opening between the seal strips and the adjacent stationary components to prevent loss of cooling fluids into the hot gas path and to preventingestion of hot gases into the cooling chambers radially inboard of the rotational airfoil.

The airfoil seal system includes a seal base configured to be received within a channel of a rotational airfoil proximate to a platform extending from the airfoil. The seal base may generally be an arcuate segment. The seal base may be configured to extend a length at least substantially equal to a length along an intersection between a rotational airfoil and an adjacent stationary airfoil. In another embodiment, the seal base may be configured to extend a length at least substantially equal to a length along an intersection between two rotational airfoils and adjacent stationary airfoils.

A plurality of seal strips may be generally aligned with each other and may overlap each other. The plurality of seal strips may be attached to the seal base and extend from the seal base a length sufficient to seal a gap between the platform of the rotational airfoil and the adjacent stationary component. The seal strips may be flexible such that the seal strips may be flexed during operation of the gas turbine engine thereby sealing the gap between the platform of the rotational airfoil and the adjacent stationary component. The seal strips may be formed from alloys or other appropriate materials. The plurality of seal strips may be curved out of plane from the seal base such that when the seal base is attached to the channel of a rotational airfoil, ends of the plurality of seal strips curve toward adjacent stationary components. In one embodiment, the plurality of seal strips may be curved out of plane from the seal base such that when the seal base is attached to the channel of a rotational airfoil such that the seal base is generally aligned with a longitudinal axis of the rotational airfoil, ends of the plurality of seal strips curve toward adjacent stationary components. In at least one embodiment, the rotational airfoil may include an upstream channel and a downstream channel, wherein both channels house a seal base.

An advantage of this invention is that when a turbine engine is operating, centrifugal forces bend the strips radially outward resulting in a closure of the radial clearance between the seal strips and the stationary seal lip extending inward from the upstream and downstream stationary components.

Another advantage of this invention is that the airfoil seal system creates a tortuous flow path that reduces the influx of hot gases from the hot gas path.

Yet another advantage of this invention is that the airfoil seal system may be used with turbine airfoils and compressor airfoils alike.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
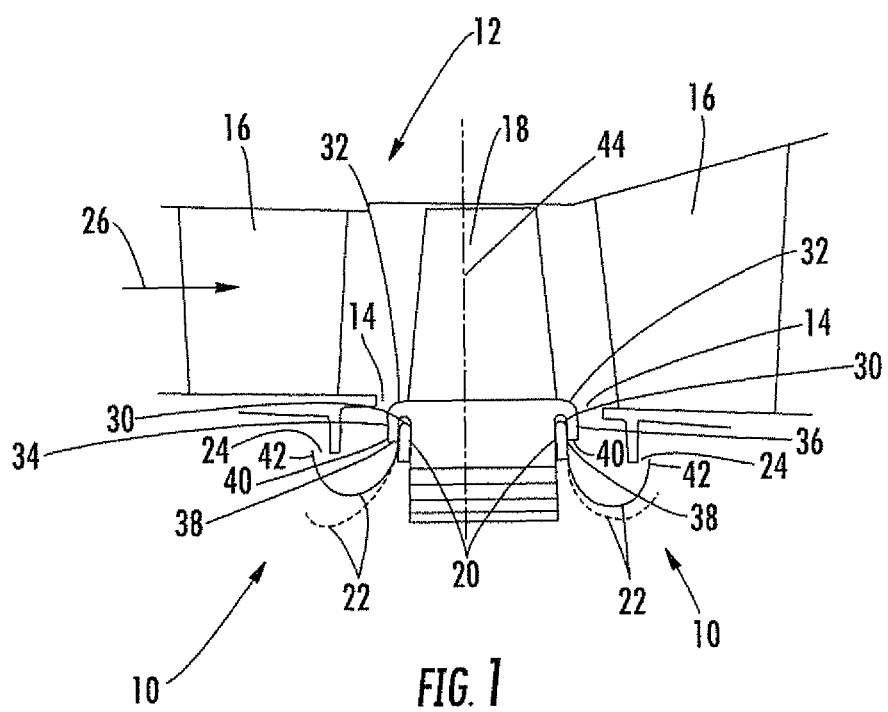
FIG. 1 is a partial side view of a turbine engine with an airfoil seal system attached to upstream and downstream sides of the airfoil.
Figure 2:
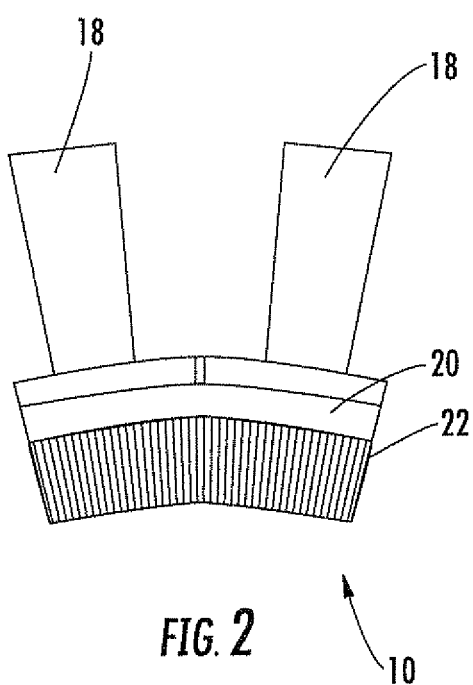
FIG. 2 is an axial view of the airfoil seal system.

As shown in FIGS. 1-2, this invention is directed to an airfoil seal system 10 for a gas turbine engine 12 that is configured to seal gaps 14 between adjacent stationary airfoils 16, such as turbine or compressor vanes or other stationary components, and rotational airfoils 18, such as turbine or compressor blades. The airfoil seal system 10 may be formed from a seal base 20 having a plurality of seal strips 22 extending therefrom and configured such that during operation of the gas turbine engine 12, the seal strips 22 bend and reduce the opening 24 between the seal strips 22 and the adjacent stationary components 16 to prevent loss of cooling fluids into the hot gas path 26 and to prevent ingestion of hot gases into the cooling chambers radially inboard of the rotational airfoil 18.

The airfoil seal system 10 may be formed from a seal base 20 configured to be received within a channel 30 of a rotational airfoil 18 proximate to a platform 32 extending from the airfoil 18. The airfoil 18 may include channels 30 on upstream and downstream sides 34, 36 of the airfoil 18. The channels 30 may include channel openings 38 on radially inward sides 40 of the channels 30. The channel 30 and the seal base 20 may form an interference fit. In other embodiments, the seal base 20 may be attached to the channel 30 in other manners.

The seal base 20 may be a generally flat, planar structure, as shown in FIG. 1, and may be formed generally from an arcuate segment, as shown in FIG. 2, when viewed axially. The seal base 20 may extend a length at least substantially equal to a length along an intersection between a rotational airfoil 18 and an adjacent stationary airfoil 16. In other embodiments, the seal base 20 may extend a length at least substantially equal to a length along an intersection between two or more rotational airfoils 18 and adjacent stationary airfoils 16. Thus, the seal base 20 may extend proximate to a plurality of rotational airfoils 18.

A plurality of seal strips 22 may be generally aligned with each other and may overlap each other, as shown in FIG. 2. The plurality of seal strips 22 may be flexible such that the seal strips 22 may be flexed during operation of the gas turbine engine thereby sealing the gap 14 between the platform 32 of the rotational airfoil 18 and the adjacent stationary component 16. The seal strips 22 may be formed from alloys, such as high temperature alloys, which may include, but not limited to, PM 2000, Inconnel 738, 901 and other appropriate alloys. The seal strips 22 may be formed from thin alloys, with thicknesses between about 0.005 inch and about 0.045 inch.

The seal strips 22 may be attached to the seal base 20 and may extend from the seal base 20 a length sufficient to seal the gap 14 between the platform 32 of the rotational airfoil 18 and the adjacent stationary component 16. The seal strips 22 may extend radially inward from the seal base 20 at the intersection of the seal strips 22 and the seal base 20. Remaining portions of the seal strips 22 may be curved away from the radially inward direction and out of plane from the seal base 20, as shown in FIG. 2, such that ends 42 of the seal strips 22 curve toward adjacent stationary components 16. Thus, the plurality of seal strips 22 may be curved out of plane from the seal base 20 such that when the seal base 20 is attached to the channel 30 of a rotational airfoil 18 and the seal base 20 is generally aligned with a longitudinal axis 44 of the rotational airfoil 18, ends 42 of the plurality of seal strips 22 curve toward adjacent stationary components 18. The seal strips 22 may be bent into a curved position such that when static, the seal strips 22 do not contact adjacent stationary airfoils 16 and do not extend linearly from the seal base 20 in a radially inward direction.

During operation, the airfoil seal system 10 limits the flow of gases through the gap 14 between the stationary component 16 and the rotational airfoil 18. Before turbine engine operation, the seal strips 22 extend from the seal base 20 attached to the rotational airfoil 18 toward the adjacent stationary component 16. During operation, however, the seal strips 22 flex radially outwards, thereby placing the ends 42 of the seal strips 22 in close proximity to the adjacent stationary component 16, as shown in FIG. 2, reducing the gap 14. The seal strips 22 may overlap a sufficient distance such that where the seal strips are flexed, gaps do not form between adjacent seal strips 22.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. An airfoil seal system for airfoils of a gas turbine engine, comprising:
   a seal base configured to be received within a channel of a rotational airfoil proximate to a platform extending from the airfoil, wherein the seal base is generally an arcuate segment and wherein the seal base is configured to extend a length at least substantially equal to a length along an intersection between a rotational airfoil and an adjacent stationary component;
   a plurality of seal strips generally aligned with each other and overlapping each other, wherein the plurality of seal strips are attached to the seal base and extend generally radially inward from the seal base a length sufficient to seal a gap between the platform of the rotational airfoil and the adjacent stationary component;
   wherein the plurality of seal strips are flexible such that the seal strips may be flexed during operation of the gas turbine engine thereby sealing the gap between the platform of the rotational airfoil and the adjacent stationary component.

2. The airfoil seal system for airfoils of a gas turbine engine of claim 1, wherein the plurality of seal strips are formed from alloys.

3. The airfoil seal system for airfoils of a gas turbine engine of claim 1, wherein the plurality of seal strips are curved out of plane from the seal base such that when the seal base is attached to the channel of a rotational airfoil, ends of the plurality of seal strips curve toward adjacent stationary components.

4. The airfoil seal system for airfoils of a gas turbine engine of claim 3, wherein the plurality of seal strips are curved out of plane from the seal base such that when the seal base is attached to the channel of a rotational airfoil such that the seal base is generally aligned with a longitudinal axis of the rotational airfoil, ends of the plurality of seal strips curve toward adjacent stationary components.

5. The airfoil seal system for airfoils of a gas turbine engine of claim 1, wherein the seal base extends a length at least substantially equal to a length along an intersection between at least two rotational airfoils and adjacent stationary components.

6. An airfoil seal system for airfoils of a gas turbine engine, comprising:
- a rotational airfoil having at least one channel proximate to a platform extending from an upstream side of the airfoil;
- a seal base positioned within the channel of the rotational airfoil, wherein the seal base is generally an arcuate segment and wherein the seal base extends a length at least substantially equal to a length along an intersection between the rotational airfoil and an adjacent stationary component;
- a plurality of seal strips generally aligned with each other and overlapping each other, attached to the seal base and extending generally radially inward from the seal base a length sufficient to seal a gap between the platform of the rotational airfoil and the adjacent stationary component;
- wherein the plurality of seal strips are flexible such that the seal strips may be flexed during operation of the gas turbine engine thereby sealing the gap between the platform of the rotational airfoil and the adjacent stationary component.

7. The airfoil seal system for airfoils of a gas turbine engine of claim 6, wherein the plurality of seal strips are formed from alloys.

8. The airfoil seal system for airfoils of a gas turbine engine of claim 6, wherein the plurality of seal strips are curved out of plane from the seal base such that ends of the plurality of seal strips curve toward adjacent stationary components.

9. The airfoil seal system for airfoils of a gas turbine engine of claim 8, wherein the seal base is generally aligned with a longitudinal axis of the rotational airfoil and wherein the plurality of seal strips extend radially inward at an intersection of the seal strips and the seal base and are curved out of plane from the seal base such that ends of the plurality of seal strips curve toward adjacent stationary components.

10. The airfoil seal system for airfoils of a gas turbine engine of claim 6, wherein the seal base extends a length at least substantially equal to a length along an intersection between at least two rotational airfoils and adjacent stationary components.

11. The airfoil seal system for airfoils of a gas turbine engine of claim 6, wherein the rotational airfoil comprises at least one channel proximate to a platform extending from the airfoil on an upstream side of the airfoil and at least one channel proximate to a platform extending from the airfoil on a downstream side of the airfoil; further comprising a seal base positioned within the channel of the downstream side of the rotational airfoil, wherein the seal base is generally an arcuate segment and wherein the seal base extends a length at least substantially equal to a length along an intersection between the rotational airfoil and an adjacent stationary component; a plurality of seal strips generally aligned with each other and overlapping each other, attached to the seal base and extending from the seal base a length sufficient to seal a gap between the platform of the rotational airfoil and the adjacent stationary component; wherein the plurality of seal strips are flexible such that the seal strips may be flexed during operation of the gas turbine engine thereby sealing the gap between the platform of the rotational airfoil and the adjacent stationary component.

12. An airfoil seal system for airfoils of a gas turbine engine, comprising:
- a rotational airfoil having at least one channel proximate to a platform extending from an upstream side of the airfoil;
- a seal base positioned within the channel of the rotational airfoil, wherein the seal base is generally an arcuate segment and wherein the seal base extends generally radially inward a length at least substantially equal to a length along an intersection between the rotational airfoil and an adjacent stationary component, wherein the seal base is generally aligned with a longitudinal axis of the rotational airfoil;
- a plurality of seal strips generally aligned with each other and overlapping each other, attached to the seal base and extending from the seal base a length sufficient to seal a gap between the platform of the rotational airfoil and the adjacent stationary component, wherein the plurality of seal strips extend radially inward at an intersection of the seal strips and the seal base and are curved out of plane from the seal base such that ends of the plurality of seal strips curve toward adjacent stationary components;
- wherein the plurality of seal strips are flexible such that the seal strips may be flexed during operation of the gas turbine engine thereby sealing the gap between the platform of the rotational airfoil and the adjacent stationary component; and
- wherein the seal base extends a length at least substantially equal to a length along an intersection between at least two rotational airfoils and adjacent stationary components.

13. The airfoil seal system for airfoils of a gas turbine engine of claim 12, wherein the plurality of seal strips are formed from alloys.

14. The airfoil seal system for airfoils of a gas turbine engine of claim 12, wherein the rotational airfoil comprises at least one channel proximate to a platform extending from the airfoil on an upstream side of the airfoil and at least one channel proximate to a platform extending from the airfoil on a downstream side of the airfoil; further comprising a seal base positioned within the channel of the downstream side of the rotational airfoil, wherein the seal base is generally an arcuate segment and wherein the seal base extends a length at least substantially equal to a length along an intersection between the rotational airfoil and an adjacent stationary component; a plurality of seal strips generally aligned with each other and overlapping each other, attached to the seal base and extending from the seal base a length sufficient to seal a gap between the platform of the rotational airfoil and the adjacent stationary component; wherein the plurality of seal strips are flexible such that the seal strips may be flexed during operation of the gas turbine engine thereby sealing the gap between the platform of the rotational airfoil and the adjacent stationary component.

\* \* \* \* \*